US011570196B2

United States Patent
Kang et al.

(10) Patent No.: US 11,570,196 B2
(45) Date of Patent: Jan. 31, 2023

(54) METHOD FOR DETERMINING DUPLICATION OF SECURITY VULNERABILITY AND ANALYSIS APPARATUS USING SAME

(71) Applicant: NAVER CLOUD CORPORATION, Seongnam-si (KR)

(72) Inventors: Bong Goo Kang, Seongnam-si (KR); Min Seob Lee, Seongnam-si (KR); Won Tae Jang, Seongnam-si (KR); June Ahn, Seongnam-si (KR); Jihwan Yoon, Seongnam-si (KR)

(73) Assignee: NAVER CLOUD CORPORATION, Seongnam-si (KR)

( * ) Notice: Subject to any disclaimer, the term of this patent is extended or adjusted under 35 U.S.C. 154(b) by 485 days.

(21) Appl. No.: 16/801,459

(22) Filed: Feb. 26, 2020

(65) Prior Publication Data
US 2020/0314135 A1    Oct. 1, 2020

(30) Foreign Application Priority Data

Mar. 28, 2019  (KR) .......................... 10-2019-0036357

(51) Int. Cl.
*H04L 9/40* (2022.01)
*H04L 9/06* (2006.01)
*G06F 16/958* (2019.01)
*G06F 16/955* (2019.01)
*G06F 16/22* (2019.01)

(52) U.S. Cl.
CPC ...... *H04L 63/1433* (2013.01); *G06F 16/2255* (2019.01); *G06F 16/9566* (2019.01); *G06F 16/986* (2019.01); *H04L 9/0643* (2013.01)

(58) Field of Classification Search
CPC ............... H04L 63/1433; H04L 9/0643; H04L 63/1425; H04L 63/1466; H04L 61/4505; H04L 63/1408; G06F 16/986; G06F 16/2255; G06F 16/9566; G06F 21/577
See application file for complete search history.

(56) References Cited

U.S. PATENT DOCUMENTS

| | | | |
|---|---|---|---|
| 2016/0154839 A1* | 6/2016 | Bezawada | G06F 21/64 707/692 |
| 2018/0253252 A1* | 9/2018 | Yamamoto | G06F 3/0619 |
| 2020/0097662 A1* | 3/2020 | Hufsmith | H04L 9/0643 |

FOREIGN PATENT DOCUMENTS

| | | |
|---|---|---|
| JP | 2006215735 A | 8/2006 |
| KR | 101725404 B1 | 4/2017 |

(Continued)

OTHER PUBLICATIONS

Office action issued in corresponding Korean application No. 10-2019-0036357, dated Jun. 19, 2020.

*Primary Examiner* — Austin J Moreau
(74) *Attorney, Agent, or Firm* — Greer Burns & Crain Ltd.

(57) ABSTRACT

A method for determining duplication of a vulnerability may include a vulnerability extraction step of extracting vulnerability uniform resource locator (URL) addresses including the vulnerability from an analysis target server; a hash generation step of generating the URL hash value corresponding to the extracted vulnerability from the vulnerability URL address; and a duplication determination step of determining, when the URL hash value is present in the first comparison table, that the vulnerability is duplicated and excluding the corresponding vulnerability from vulnerability information.

9 Claims, 7 Drawing Sheets

(56) References Cited

FOREIGN PATENT DOCUMENTS

| WO | WO-2012166120 A1 | * | 12/2012 | .......... G06F 11/0727 |
| WO | WO-2017068904 A1 | * | 4/2017 | ........... G06F 3/0608 |
| WO | WO-2019127869 A1 | * | 7/2019 | |

* cited by examiner

METHOD FOR DETERMINING DUPLICATION OF SECURITY VULNERABILITY AND ANALYSIS APPARATUS USING SAME

CROSS-REFERENCE TO RELATED APPLICATIONS

This application claims priority to Korean Patent Application No. 10-2019-0036357 filed on Mar. 28, 2019 in Korean Intellectual Property Office, the entire contents of which is hereby incorporated by reference in its entirety.

BACKGROUND OF THE INVENTION

Field of Invention

The present invention relates to a method for determining duplication of a security vulnerability and an analysis apparatus using the same, and more particularly, to a method for determining duplication of a vulnerability and an analysis apparatus using the same, which are capable of removing duplication of vulnerabilities discovered in an analysis target server.

Description of Related Art

In recent years, as web services and web interfaces become familiar with users, integration of a traditional application program to a web based system is accelerated. With the development of web services, a problem of a web application itself, and adverse effects such as ignorance of programmers regarding security, disabling firewalls, avoidance of intrusion detection, and diversification of a hacking tool are becoming serious problems.

In order to prevent various forms of attacks on web applications, intrusion of an attack code should be interrupted for each parameter included in a uniform resource locator (URL), and in order to fundamentally interrupt intrusion of the attack code for each parameter, whether there is vulnerability for each attack pattern should be first determined with respect to all parameters included in each URL.

BRIEF SUMMARY OF THE INVENTION

The present invention has been made in an effort to provide a method for determining duplication of a security vulnerability and an analysis apparatus using the same, which are capable of removing duplication of vulnerabilities detected at the time of analyzing the vulnerability for an analysis target server.

The present invention has been made in an effort to provide a method for determining duplication of a vulnerability and an analysis apparatus using the same, which are capable of removing duplication of vulnerabilities which are effectively discovered according to a type of vulnerability and an analysis apparatus using the same.

An exemplary embodiment of the present invention provides a method for determining duplication of a vulnerability which may include: a vulnerability extraction step of extracting vulnerability uniform resource locator (URL) addresses including the vulnerability from an analysis target server; a hash generation step of generating the URL hash value corresponding to the extracted vulnerability from the vulnerability URL address; and a duplication determination step of determining, when the URL hash value is present in the first comparison table, that the vulnerability is duplicated and excluding the corresponding vulnerability from vulnerability information.

Another exemplary embodiment of the present invention provides a method for determining duplication of a vulnerability which may include: a vulnerability extraction step of extracting vulnerability uniform resource locator (URL) addresses including the vulnerability from an analysis target server; a hash generation step of generating a tag hash value corresponding to a response page connected to the vulnerability URL address; and a duplication determination step of determining, when the tag hash value is present in a second comparison table, that the vulnerability is duplicated and excluding the corresponding vulnerability from vulnerability information.

Still another exemplary embodiment of the present invention provides a method for determining duplication of a vulnerability which may include: extracting a vulnerability URL address including a vulnerability from an analysis target server; generating a URL hash value corresponding to the vulnerability from the vulnerability URL address; searching the URL hash value in a first comparison table; generating, when the URL hash value is present in the first comparison table, a tag hash value corresponding to a response page connected to the vulnerability URL address; searching the tag hash value in a second comparison table; and determining, when the tag hash value is present in the second comparison table, that the vulnerability is duplicated and excluding the corresponding vulnerability from vulnerability information.

Yet another exemplary embodiment of the present invention provides an analysis apparatus which may include: a vulnerability extraction unit extracting a vulnerability URL address including a vulnerability from an analysis target server; a hash generation unit generating a URL hash value corresponding to the vulnerability from the vulnerability URL address or generating a tag hash value corresponding to a response page connected to the vulnerability URL address; and a duplication determination unit determining whether the vulnerability is duplicated by using the URL hash value or tag hash value.

The technical solution above does not list all features of the present invention. Various features of the present invention and advantages and effects according thereto will be understood in more detail with reference to specific embodiments below.

According to an exemplary embodiment of the present invention, a method for determining duplication of a vulnerability and an analysis apparatus using the same are capable of removing duplication of vulnerabilities detected at the time of analyzing the vulnerability for an analysis target server. Therefore, a problem can be prevented, in that unnecessary information on the vulnerability becomes too large, and as a result, a meaningful detection result is missed. Further, when there is a case where points that the vulnerability should be modified are the same, then the case can be regarded as the duplication of vulnerabilities, and the case can be removed.

According to an exemplary embodiment of the present invention, since a method for determining duplication of a vulnerability and an analysis apparatus using the same do not just directly compare URL addresses but compare structures of the URL addresses, vulnerabilities which are substantially the same can be determined as the duplication. Further, since the URL addresses are compared by further including the structure of a response page connected to the URL address according to the type of discovered vulnerability, the duplication of the vulnerability can be accurately determined.

However, effects which can be obtained by the method for determining duplication of a vulnerability and an analysis apparatus using the same according to the exemplary embodiments of the present invention are not limited to the aforementioned advantages and other unmentioned advantages will be clearly understood by those skilled in the art from the following description.

DETAILED DESCRIPTION OF THE INVENTION

Hereinafter, exemplary embodiments disclosed in this specification will be described in detail with reference to the accompanying drawings and the same or similar components are denoted by the same reference numerals regardless of a sign of the drawing, and duplicated description thereof will be omitted. Suffixes "module" and "unit" for components used in the following description are given or mixed in consideration of easy preparation of the specification only and do not have their own distinguished meanings or roles. Further, the term "unit" used in the specification means software and hardware components such as FPGA or ASIC and the "unit" performs predetermined roles. However, the "unit" is not a meaning limited to software or hardware. The "unit" may be configured to reside on an addressable storage medium and may be configured to play back one or more processors. Accordingly, as one example, the "unit" includes components such as software components, object oriented software components, class components, and task components, processes, functions, attributes, procedures, subroutines, segments of a program code, drivers, firmware, microcode, circuitry, data, databases, data structures, tables, arrays, and variables. Functions provided in the components and the "units" may be combined into a smaller number of components and "units" or further separated into additional components and "units".

In describing an exemplary embodiment disclosed in the present disclosure, a detailed description of related known technologies will be omitted if it is determined that the detailed description makes the gist of the exemplary embodiment of the present disclosure unclear. Further, it is to be understood that the accompanying drawings are just used for easily understanding the exemplary embodiments disclosed in this specification and a technical spirit disclosed in this specification is not limited by the accompanying drawings and all changes, equivalents, or substitutes included in the spirit and the technical scope of the present invention are included.

Figure 1:
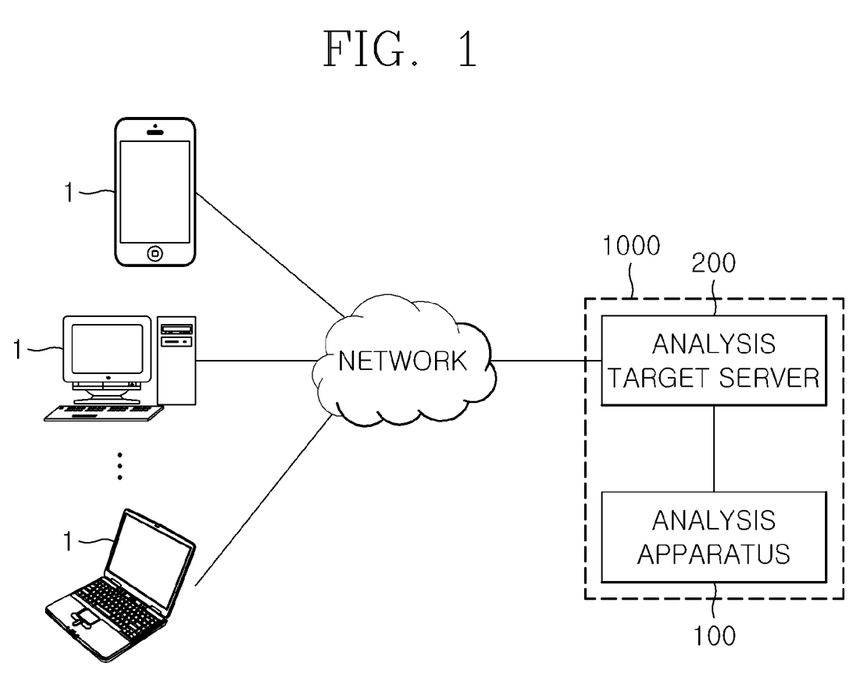
FIG. 1 is a schematic view illustrating a vulnerability analysis system according to an exemplary embodiment of the present invention.

FIG. 1 is a schematic view illustrating a vulnerability analysis system according to an exemplary embodiment of the present invention.

Referring to FIG. 1, a vulnerability analysis system 1000 according to an exemplary embodiment of the present invention may include an analysis target server 200 and an analysis apparatus 100.

The analysis apparatus 100 analyzes an analysis target server 200 to extract vulnerabilities of a web page, a web application, etc., provided by the analysis target server 200. That is, due to a defect of hardware or software of the analysis target server 200 or a weak point in the design, weak points which enable an operation of a right granted to a user of a terminal apparatus 1 or reading, forgery, and leakage of information of an allowed range may be checked.

The analysis apparatus 100 may include a plurality of analysis modules and analyze various types of vulnerabilities including Structured Query Language (SQ) Injection, Cross Site Scripting (XSS), Server Side Request Forgery (SSRF), and the like through respective analysis modules. Here, the respective analysis modules perform a simulated attack on the analysis target server 200 to analyze the vulnerability of the analysis target server 200.

The analysis target server 200 may be a web server providing a web service to the terminal apparatus 1 and provide a web page, etc., in response to a request of the terminal apparatus 1. The analysis target server 200 may be implemented by a separate physical component as illustrated in FIG. 1 and in some exemplary embodiments, the analysis target server 200 may be implemented as a virtual machine included in a cloud server, etc.

The analysis apparatus 100 may attack the analysis target server 200 by various schemes in order to increase a spy rate for the vulnerability of the analysis target server 200 and bypass a defense solution constructed in the analysis target server 200. However, the same vulnerabilities may be duplicatively detected by attack schemes, and in this case, unnecessary and excessive information on the vulnerability may be obtained, and as a result, a meaningful detection result may be missed.

However, the analysis apparatus 100 according to an exemplary embodiment of the present invention may determine duplicated vulnerabilities and exclude the determined duplicate vulnerability from the vulnerabilities at the time of extracting the vulnerability from the analysis target server 200.

Figure 2:
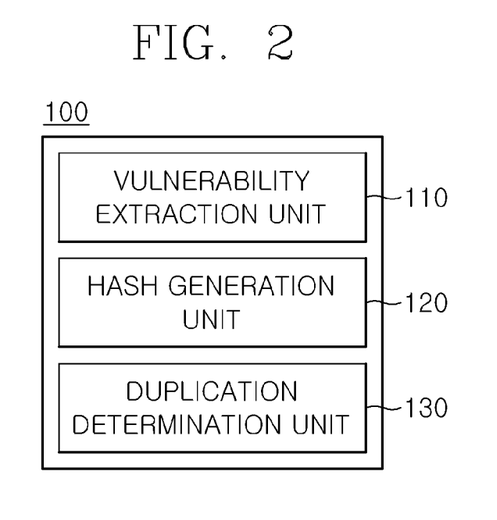
FIG. 2 is a block diagram illustrating an analysis apparatus according to an exemplary embodiment of the present invention.

Referring to FIG. 2, the analysis apparatus 100 according to an exemplary embodiment of the present invention may include a vulnerability extraction unit 110, a hash generation unit 120, and a duplication determination unit 130. Each of the units 110, 120, 130 may be implemented in a separate processor designed to perform a corresponding task, or they may all be implemented in one processor that performs each of the functions of all the units 110, 120, 130. In some embodiments, the vulnerability extraction unit 110, the hash generation unit 120 and the duplication determination unit 130 may be software components whose code or instructions are performed by one or more processors.

The vulnerability extraction unit 110 may extract vulnerability uniform resource locator (URL) addresses including the vulnerability from the analysis target server 200. The vulnerability extraction unit 110 may include a plurality of analysis modules, and the respective analysis modules may analyze the vulnerability of the analysis target server 200 by different schemes, respectively. Here, the respective analysis modules may extract vulnerability URL addresses including the vulnerability as a vulnerability analysis result and vulnerability parameters included in the vulnerability URL addresses.

The hash generation unit 120 may generate hash values which may identify the respective extracted vulnerabilities. Here, the hash generation unit 120 may generate a URL hash value corresponding to the vulnerability URL address and a tag hash value corresponding to the response page connected to the vulnerability URL address.

Specifically, the hash generation unit 120 may generate the URL hash value by using the structure of the vulnerability URL address. First, the hash generation unit 120 may generate a URL character string by removing a parameter name and a parameter value of the vulnerability parameter determined as the vulnerability in the vulnerability URL address. Here, since the hash generation unit 120 generates the URL character string by excluding the vulnerability parameter from the vulnerability URL address, the hash generation unit 120 may distinguish each case where a plurality of vulnerability parameters is included in one vulnerability URL address. In other words, since the hash generation unit 120 may differentiate the vulnerability parameter excluded from the vulnerability URL address for each vulnerability, the hash generation unit 120 may generate a different URL character string for each vulnerability parameter.

Thereafter, the hash generation unit 120 removes parameter values of remaining parameters included in the URL character string and rearranges the parameter names of the parameters according to an ordering order to generate the rearranged character string. Here, since the parameter values of the remaining parameters are removed except for the vulnerability parameter, it is possible to duplicatively process vulnerabilities having only different parameter values and the same structure. For example, when there is a vulnerability in a specific bulletin board of the web page, in URL addresses of respective bulletin messages included in the specific bulletin board, only parameter values of "no" indicating a bulletin number are different and the remaining structures may be the same as each other. In this case, in order to prevent URL addresses of all bulletin messages included in the specific bulletin board from being extracted as different vulnerabilities, the hash generation unit 120 may remove the parameter values of the parameter "no" and generate the URL hash value. In other words, the hash generation unit 120 may regard as the duplication a case where points where the vulnerability should be modified are the same as each other from a technical viewpoint.

When the rearranged character string is generated, the hash generation unit 120 inputs the rearranged character string into a hash function to generate the URL hash value corresponding to the rearranged character string. In some exemplary embodiments, it is possible to determine whether the respective vulnerabilities are duplicated by using the rearranged character string, but the hash generation unit 120 may convert the rearranged character string into the hash value and utilize the hash value. In other words, the rearranged character string is converted into the URL hash value to reduce the size of data, and a search speed and efficiency in memory usage in a comparison table may be enhanced.

By taking a case where the vulnerability URL address is "http://test.com/test.php?no=212&id=tester&title=test" and the vulnerability parameter is "title" as an example, the hash generation unit 120 first removes "title" which is the parameter name and a parameter value "test" of the vulnerability parameter to generate the URL character string as "http://test.com/test.php?no=212&id=tester". Thereafter, "http://test.com/test.php?no=&id=" may be generated by removing "212" and "tester" which are the parameter values of "no" and "id" which are the remaining parameters included in the URL character string and "http://test.com/test.php?id=&no=" may be generated as the rearranged character string by rearranging "no" and "id" according to an alphabetic order. After the rearranged character string is generated, the corresponding URL hash value may be generated by inputting the rearranged character string "http://test.com/test.php?id=&no=" into the hash function such as SHA-256.

The hash generation unit 120 may generate the tag hash value corresponding to the response page connected to the vulnerability URL address in addition to the URL hash value. Specifically, there may be a response page which is the web page corresponding to the vulnerability URL address and each response page may be implemented as a hypertext markup language (HTML) code. In this case, the hash generation unit 120 may extract tag names of tags included in the HTML code of the response page and in this case, the hash generation unit 120 may exclude the tag names corresponding to tags for contents among the tag names. In other words, in order to set the tag hash value capable of identifying the structure of the response page, the tag for contents which may be arbitrarily input by a user may be excluded. Here, the tag names corresponding to the tags for contents may be previously set. Thereafter, the hash generation unit 120 connects the tag names according to an order disclosed in the HTML code to generate a tag character string and applies the hash function to the tag character string to generate the tag hash value.

TABLE 1

```
<html>
    <head>
        <meta charset="UTF-8">
        <title>image tag</title> ·
    </head>
    <body>
        <a href="https://www.itworld.com/" target="_blank>
        <img src ="img.png" alt="news icon image"/>
        </a>
        <br/>
        <img src ="img.png" alt="news icon image" width="70"/>
    </body>
</html>
```

For example, the HTML code of the response page may be implemented as shown in Table 1 above and the hash generation unit 120 may extract respective tags <html>, <head>, <meta>, <title>, <body>, <a>, <img>, <br/>, etc. Here, the <img> tag may be previously set as the tag for contents and in this case, the hash generation unit 120 may exclude the <img> tag. Accordingly, the hash generation unit 120 excludes the <img> tag and connects the remaining tags according to the order disclosed in the HTML code to generate the tag character string such as "htmlheadmetatitle/ titlebodya/abr//body/html". Thereafter, the tag character string is applied to the hash function such as SHA-256 to generate the tag hash value.

The hash generation unit 120 may differentiate the type of generated hash value according to the type of each vulnerability. For example, in the case of the SQL injection vulnerability, the URL hash value may be generated and in the case of the XSS vulnerability, both the URL hash value and the tag hash value may be generated. In some exemplary embodiments, the types of vulnerabilities extracted for each analysis module included in the vulnerability extraction unit 110 may be different and in this case, the hash generation unit 120 may differentiate the hash value generated for each analysis module.

The duplication determination unit 130 may determine whether the vulnerability URL addresses may be duplicated by using the URL hash value or the tag hash value. Here, the duplication determination unit 130 may utilize the URL hash value or the tag hash value according to the type of vulnerability.

Specifically, in the case of the vulnerability for SQL injection, etc., the duplication determination unit 130 may determine whether the vulnerabilities extracted by using the URL hash value are duplicated. In this case, the duplication determination unit 130 may receive from the hash generation unit 120 the URL hash value corresponding to the extracted vulnerability URL address and compare each URL hash value with a first comparison table. Here, the URL hash values corresponding to the previously extracted vulnerability may be stored in the first comparison table and the duplication determination unit 130 may search the URL hash values corresponding to the vulnerabilities determined to be duplicated at present in the first comparison table. In some exemplary embodiments, the first comparison table may be implemented as a data dictionary, etc.

Thereafter, when there is a hash value which is the same as the URL hash value in the first comparison table, the duplication determination unit 130 may determine that the vulnerabilities corresponding to the corresponding URL hash values are duplicated and exclude the corresponding vulnerabilities from vulnerability information. In contrast, when the URL hash value is not present in the first comparison table, it may be determined that the corresponding vulnerabilities are not duplicated. In this case, the duplication determination unit 130 may encapsulate the corresponding vulnerability in the vulnerability information and add the corresponding URL hash value to the first comparison table and update the added URL hash value.

In the case of the XSS vulnerability, etc., even though the structures of the URL addresses are the same as each other, if the structures of the response pages are different, the vulnerabilities may be different from each other. Accordingly, for the duplication determination of the XSS vulnerability, a similarity of the response page structure needs to be compared. Accordingly, the duplication removal unit 130 primarily checks whether the vulnerabilities are duplicated by using the URL hash value and then when it is determined that the vulnerabilities are duplicated in the URL hash value, the duplication removal unit 130 may secondarily check whether the vulnerabilities are duplicated with the tag hash value again. In other words, in the case of the XSS vulnerability, etc., only when it is determined that all of the vulnerabilities are duplicated by duplication check using the URL hash value and the tag hash value, it is determined the XSS vulnerability is duplicated.

Specifically, the duplication determination unit 130 may receive from the hash generation unit 120 the URL hash value corresponding to the vulnerability URL address and compare the URL hash value with the first comparison table. Here, when the URL hash value is present in the first comparison table, the duplication determination unit 130 may request the tag hash value to the hash generation unit 120. In other words, since it is inefficient that all of the tag hash values for respective response pages are generated, only when the URL hash values are determined to be duplicated, the tag hash value may be requested to be generated.

Thereafter, the duplication determination unit 130 may search the tag hash value in a second comparison table and only when the tag hash value is present in a second comparison table, the corresponding vulnerability URL addresses may be determined to be duplicated. Here, the tag hash values corresponding to the previously extracted vulnerability may be stored in the second comparison table and the duplication determination unit 130 may search the tag hash values corresponding to the vulnerabilities to be determined to be duplicated at present in the second comparison table. The second comparison table may be implemented as the data dictionary, etc.

The tag hash value is generated by using the tags included in the HTML code of the response page means and a case where the tag hash values are the same as each other means that the HTML structures of the response pages are the same as each other. In contrast, when the tag hash values are different from each other, the structures of the response pages are different from each other and there is a possibility that there are different XSS vulnerabilities due to a difference in structure of the response page. Accordingly, when the tag hash value is present in the second comparison table, the duplication determination unit 130 may determine that the vulnerability corresponding to the tag hash value is duplicated. In other words, the duplication determination unit 130 may exclude the corresponding vulnerability from the vulnerability information.

In contrast, when the URL hash value is not present in the first comparison table or the tag hash value is not present in the second comparison table, it may be determined that the corresponding vulnerability is not duplicated. In this case, the corresponding vulnerability may be encapsulated in the vulnerability information and the corresponding URL hash value is added to the first comparison table, or the tag hash value is added to the second comparison table to update the corresponding URL hash value or the tag hash value.

Figure 3:
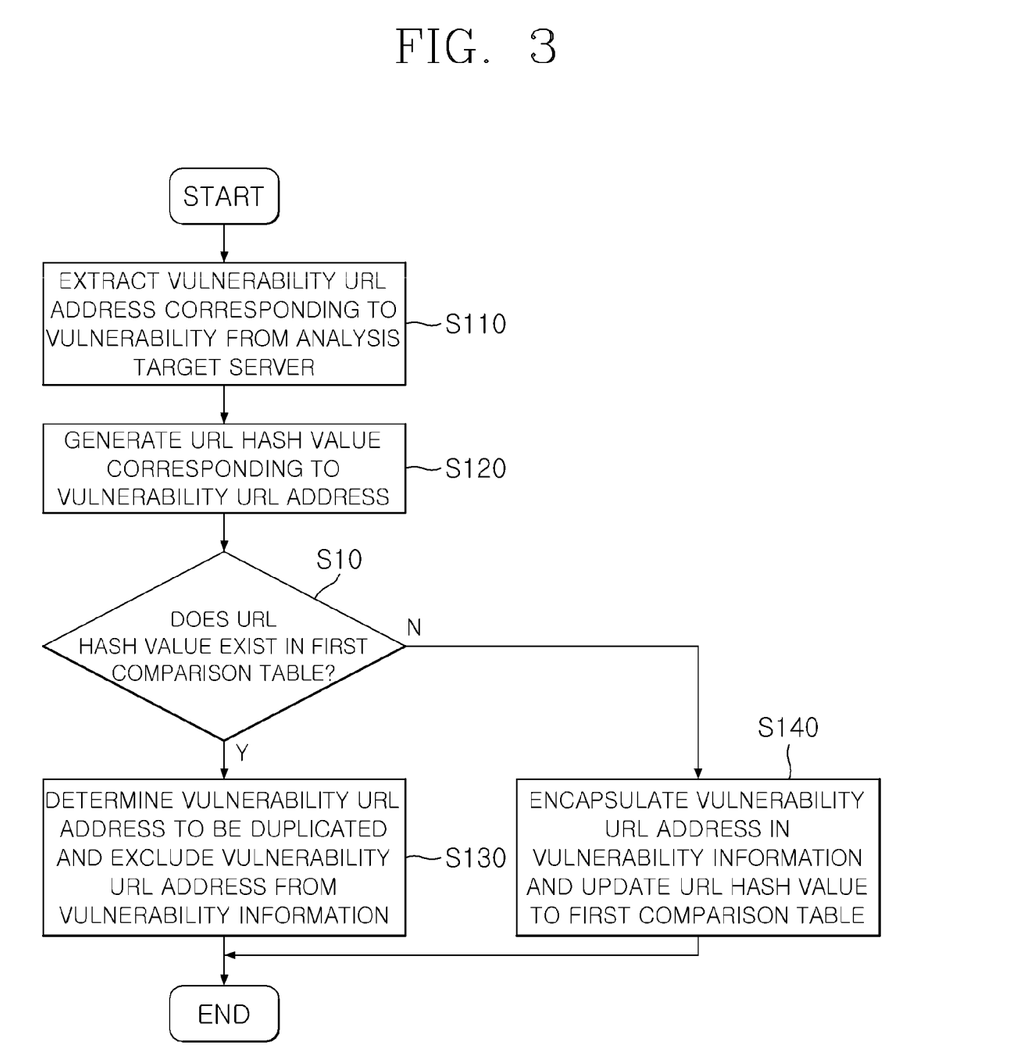
FIG. 3 is a flowchart showing a method for determining duplication of a vulnerability according to an exemplary embodiment of the present invention.

FIG. 3 is a flowchart showing a method for determining duplication of a vulnerability according to an exemplary embodiment of the present invention.

Referring to FIG. 3, the method for determining duplication of a vulnerability according to an exemplary embodiment of the present invention may include a vulnerability extraction step (S110), a hash generation step (S120), a duplication determination step (S130), and an update step (S140). Here, respective steps may be performed by the analysis apparatus 100.

In the vulnerability extraction step (S110), vulnerability uniform resource locator (URL) addresses including the vulnerability may be extracted from the analysis target server 200. The analysis apparatus 100 may include a plurality of analysis modules in the vulnerability extraction unit 110, and the respective analysis modules may analyze the vulnerability of the analysis target server by different schemes, respectively. Here, the respective analysis modules may extract vulnerability URL addresses including the vulnerability as a vulnerability analysis result and then check whether respective vulnerability URL addresses are duplicated.

In the hash generation step (S120), the URL hash value corresponding to the extracted vulnerability may be generated from the vulnerability URL address. In the case of the SQL injection vulnerability, etc., the URL hash value may be used at the time of determining whether the vulnerability is duplicated. Accordingly, for the vulnerability duplication determination, in the hash generation step (S120), the URL hash value corresponding to each extracted vulnerability URL address may be generated.

Figure 4:
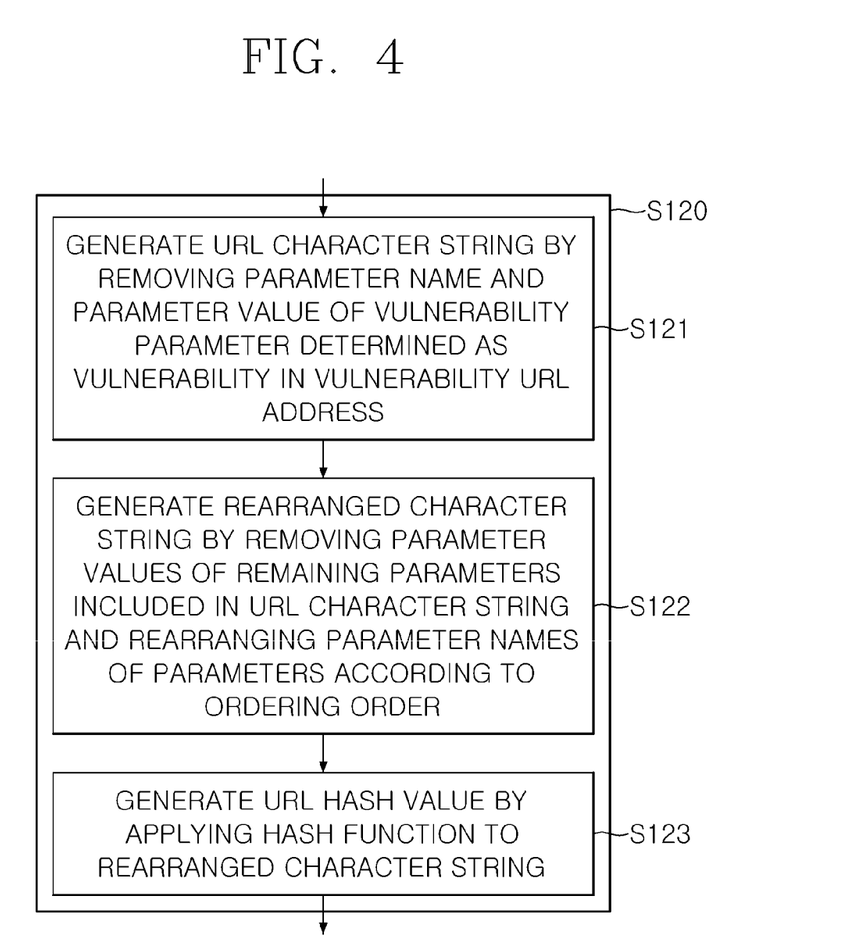
FIG. 4 is a flowchart showing generation of a URL hash value in a method for determining duplication of a vulnerability according to an exemplary embodiment of the present invention.

Specifically, in the hash generation step (S120), the URL hash value may be generated through the steps illustrated in FIG. 4. First, the analysis apparatus 100 may generate a URL character string by removing a parameter name and a parameter value of the vulnerability parameter determined as the vulnerability in the vulnerability URL address (S121). In other words, the vulnerability parameter is excluded to distinguish a case where a plurality of vulnerability parameters is included in the same vulnerability URL address, thereby generating each different URL hash value.

Thereafter, parameter values of remaining parameters included in the URL character string are removed and the parameter names of the parameters according to an ordering order are rearranged to generate the rearranged character string (S122). In this case, since the parameter values of the remaining parameters are removed except for the vulnerability parameter, it is possible to duplicatively process vulnerabilities having only different parameter values and the same structure.

After the rearranged character string is generated, the rearranged character string is input into a hash function to generate the URL hash value corresponding to the rearranged character string (S123).

In the duplication determination step (S130), when the URL hash value is present in the first comparison table (S10), it may be determined that the extracted vulnerability is duplicated and the corresponding vulnerability may be excluded from the vulnerability information. Here, the URL hash values corresponding to the previously extracted vulnerability may be stored in the first comparison table and the analysis apparatus may check whether the URL hash value corresponding to the vulnerability to be determined to be duplicated at present is present in the first comparison table (S10).

Thereafter, when there is a hash value which is the same as the URL hash value in the first comparison table, it may be determined that the vulnerabilities corresponding to the corresponding URL hash values are duplicated and the corresponding vulnerabilities may be excluded from vulnerability information.

In contrast, when the URL hash value is not present in the first comparison table, the update step (S140) may be performed. In other words, it may be determined that the corresponding vulnerability is not duplicated and the extracted vulnerability is encapsulated in the vulnerability information and the URL hash value is added to the first comparison table to update the URL hash value.

Figure 5:
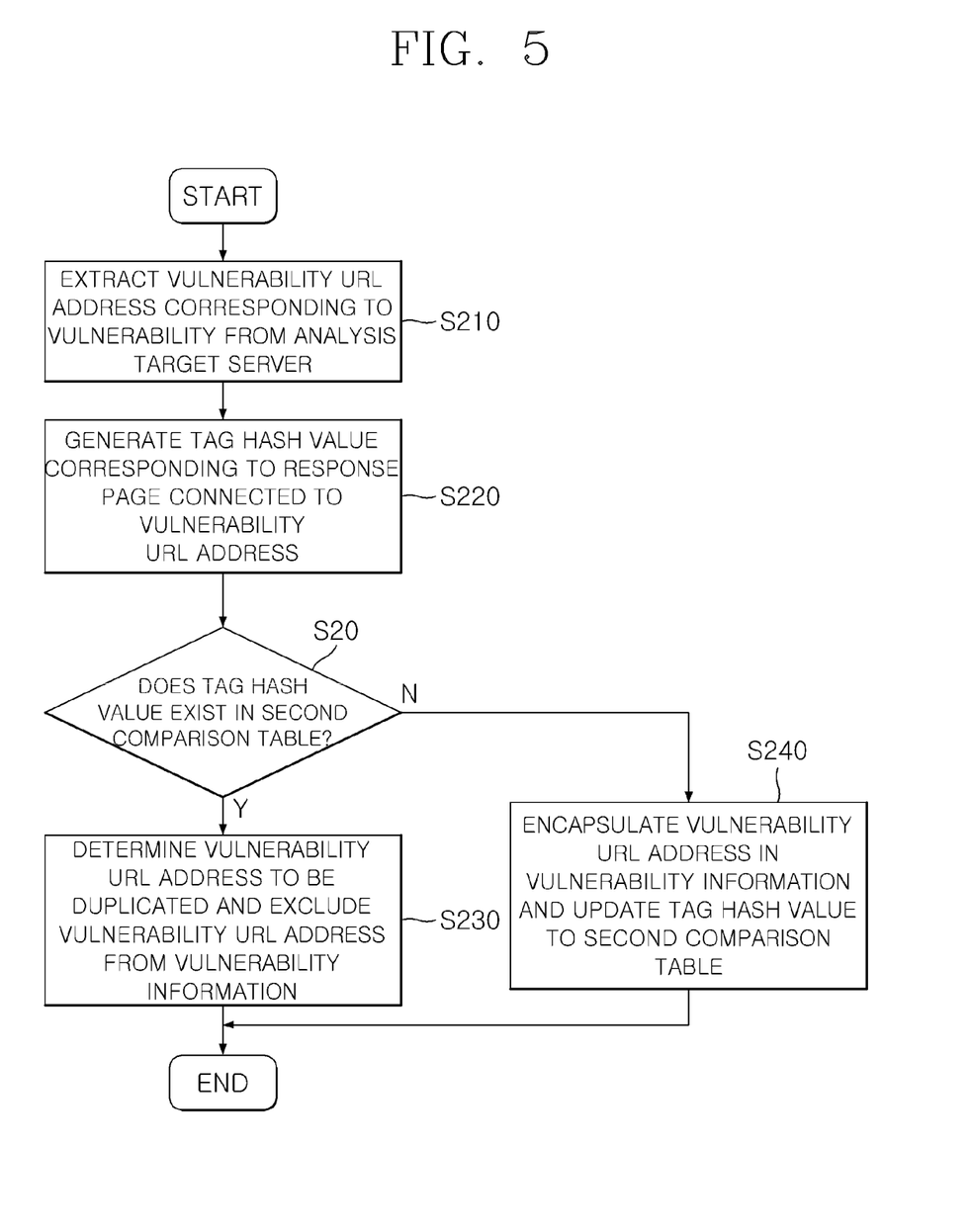
FIG. 5 is a flowchart showing a method for determining duplication of a vulnerability according to another exemplary embodiment of the present invention.

FIG. 5 is a flowchart showing a method for determining duplication of a vulnerability according to another exemplary embodiment of the present invention.

Referring to FIG. 5, the method for determining duplication of a vulnerability according to another exemplary embodiment of the present invention may include a vulnerability extraction step (S210), a hash generation step (S220), a duplication determination step (S230), and an update step (S240).

In the vulnerability extraction step (S210), the vulnerability uniform resource locator (URL) address including the vulnerability may be extracted from the analysis target server 200 and in the hash generation step (S220), the tag hash value corresponding to the response page connected to the vulnerability URL address may be generated.

Figure 6:
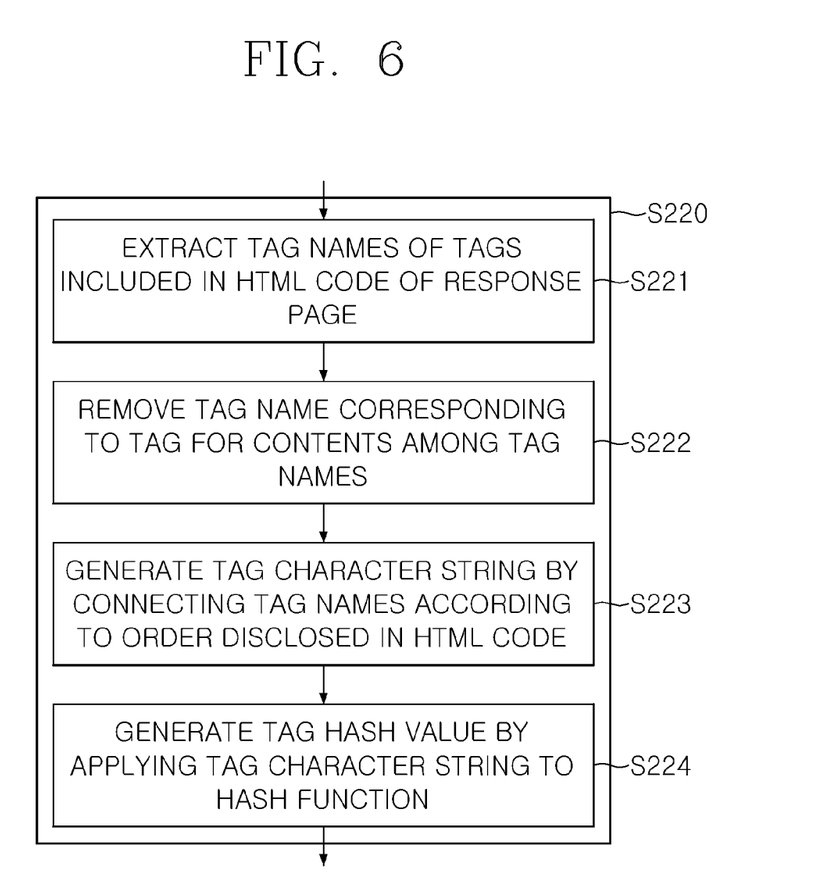
FIG. 6 is a flowchart showing generation of a tag hash value in a method for determining duplication of a vulnerability according to an exemplary embodiment of the present invention.

Here, in the hash generation step (S220), the tag hash value may be generated as illustrated in FIG. 6. Specifically, there may be a response page which is the web page corresponding to the vulnerability URL address and each response message may be implemented as a Hypertext Markup Language (HTML) code. In this case, the analysis apparatus 100 may extract tag names of tags included in the HTML code of the response message (S221) and in this case, the hash generation unit 120 may exclude the tag names corresponding to tags for contents among the tag names (S222). In other words, in order to set the tag hash value capable of identifying the structure of the response page, the tag for contents which may be arbitrarily input by a user may be excluded. Here, the tag names corresponding to the tags for contents may be previously set. Thereafter, the tag names are connected according to an order disclosed in the HTML code to generate a tag character string (S223) and the hash function is applied to the tag character string to generate the tag hash value (S224).

Thereafter, it may be checked whether the tag hash value is present in the second comparison table (S20) and when the tag hash value is present in the second comparison table, the extracted vulnerability is determined to be duplicated to be excluded from the vulnerability information (S230). Here, the tag hash values corresponding to the previously extracted vulnerability may be stored in the second comparison table and the analysis apparatus may search the tag hash values corresponding to the vulnerabilities to be determined to be duplicated at present in the second comparison table (S20).

In contrast, when the tag hash value is not present in the second comparison table, the update step (S240) may be performed. In other words, when the tag hash value is not present in the second comparison table, it may be determined that the corresponding vulnerability is not duplicated and the tag hash value is added to the second table to update the tag hash value.

Figure 7:
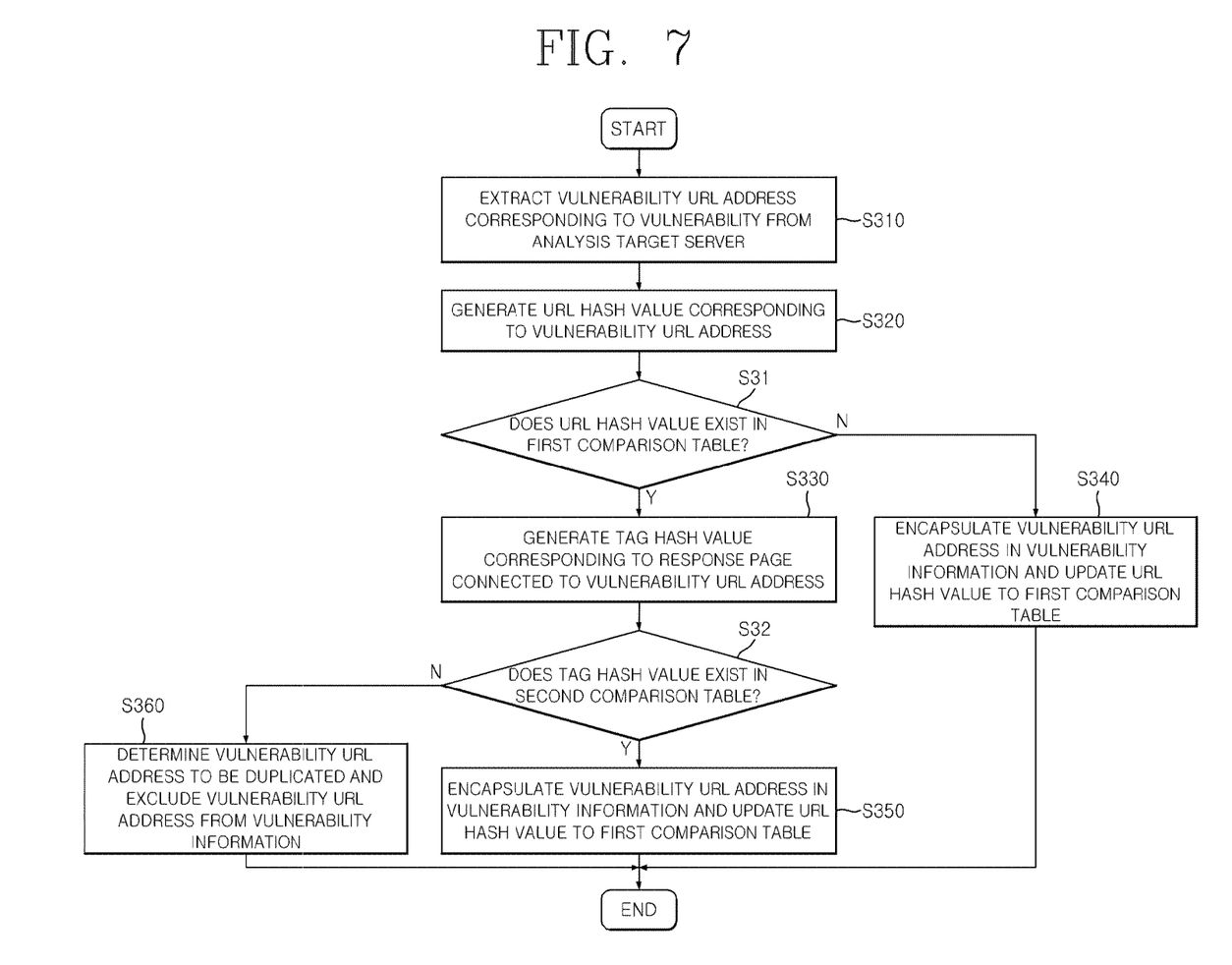
FIG. 7 is a flowchart showing a method for determining duplication of a vulnerability according to yet another exemplary embodiment of the present invention.

FIG. 7 is a flowchart showing a method for determining duplication of a vulnerability according to another exemplary embodiment of the present invention. For example, in the case of the XSS vulnerability, etc., even though the structures of the URL addresses are the same as each other, if the structures of the response pages are different, the vulnerabilities may be different from each other. Accordingly, only when the similarity of the response page structure is further compared in addition to the structure of the vulnerability URL address, correct duplication removal is available. To this end, it is primarily checked whether the vulnerabilities are duplicated by using the URL hash value and then when it is determined that the vulnerabilities are duplicated in the URL hash value, it may be secondarily checked again whether the vulnerabilities are duplicated with the tag hash value.

Referring to FIG. 7, the analysis apparatus may extract the vulnerability URL address including the vulnerability from the analysis target server 200 (S310) and generate the URL hash value corresponding to the vulnerability from the vulnerability URL address (S320). Thereafter, the analysis apparatus may search whether the URL hash value is present in the first comparison table (S31).

Here, when the URL hash value is present in the first comparison table, the tag hash value may be generated, which corresponds to the response page connected to the vulnerability URL address (S330). In other words, only when it is determined that the URL hash value is duplicated, the tag hash value may be requested to be generated.

Thereafter, it may be searched whether the tag hash value is present in the second comparison table (S32) and when the tag hash value is present in the second comparison table, the corresponding vulnerability URL address may be determined to be duplicated (S350).

In contrast, when the URL hash value is not present in the first comparison table (S340) or the tag hash value is not present in the second comparison table (S360), it may be determined that the corresponding vulnerability is not duplicated. In this case, the corresponding vulnerability may be encapsulated in the vulnerability information and the corresponding URL hash value is added to the first comparison table (S340) or the tag hash value is added to the second comparison table to update the corresponding URL hash value or the tag hash value (S360).

The present invention described above can be embodied as computer readable codes on a medium in which a program is recorded. The computer readable media may continuously store computer executable programs or temporarily store the computer executable programs for execution or download. Further, the media may be various recording means or storage means of a type in which single hardware or several hardware is coupled, and is not limited to a medium directly connected to any computer system and may also be distributed on a network. Examples of the computer readable media may include magnetic media such as hard disks, floppy disks, and magnetic tape, optical recording media such as CD-ROM disks and DVD, magneto-optical media such as floptical disks, ROM, RAM, and flash memories and may be configured to store program commands. Further, examples of other media may also include recording media or storage media managed in app stores for distributing applications, or sites and servers for supplying and distributing other various software. Accordingly, the aforementioned detailed description should not be construed as restrictive in all terms and should be considered to be exemplary. The scope of the present invention should be determined by rational construing of the appended claims and all modifications within an equivalent scope of the present invention are included in the scope of the present invention.

The present invention is not limited by the aforementioned embodiments and the accompanying drawings. It will be apparent to those skilled in the art that components according to the present invention may be substituted, modified, and changed within the scope without departing from the technical scope of the present invention.

What is claimed is:

1. A method for determining duplication of a vulnerability of an analysis target server, by an analysis apparatus, the method comprising:
    a vulnerability extraction step of extracting a vulnerability uniform resource locator (URL) address of the vulnerability from the analysis target server;
    a hash generation step of generating a URL hash value corresponding to the extracted vulnerability by rearranging a URL character string of the vulnerability URL address; and
    a duplication determination step of determining, when the URL hash value is present in a first comparison table, that the vulnerability is duplicated, and excluding the corresponding vulnerability from vulnerability information.

2. The method of claim 1, further comprising:
    an updating step of including when the URL hash value is not present in the first comparison table, the vulnerability in the vulnerability information, and adding the URL hash value to the first comparison table to update the URL hash value.

3. The method of claim 2, wherein the hash generation step includes
    generating the URL character string by removing a parameter name and a parameter value of a vulnerability parameter determined as the vulnerability in the vulnerability URL address,
    removing parameter values of remaining parameters included in the URL character string and rearranging the parameter names of the parameters according to an ordering order to generate the rearranged character string, and
    generating the URL hash value by applying a hash function to the rearranged character string.

4. A non-transitory computer readable recording medium storing a program which, when executed by a processor, performs the method for determining duplication of a vulnerability as defined in claim 1.

5. A method for determining duplication of a vulnerability of an analysis target server, by an analysis apparatus, the method comprising:
    a vulnerability extraction step of extracting a vulnerability uniform resource locator (URL) address of the vulnerability from the analysis target server;
    a hash generation step of generating a tag hash value corresponding to a response page connected to the vulnerability URL address by applying a hash function to a tag character string connecting tag names extracted from the response papge; and
    a duplication determination step of determining, when the tag hash value is present in a second comparison table, that the vulnerability is duplicated and excluding the corresponding vulnerability from vulnerability information.

6. The method of claim 5, further comprising:
    an updating step of including, when the tag hash value is not present in the second comparison table, the vulnerability in the vulnerability information, and adding the tag hash value to the second comparison table to update the tag hash value.

7. The method of claim 5, wherein the hash generation step includes
    extracting the tag names of tags included in a hypertext markup language (HTML) of the response page,
    removing tag names corresponding to tags for contents among the tag names, and
    connecting the tag names according to an order disclosed in the HTML code to generate the tag character string.

8. A method for managing vulnerability information of an analysis target server, by an analysis apparatus, the method comprising:
    extracting a vulnerability URL address including a vulnerability from the analysis target server;
    generating a URL hash value corresponding to the vulnerability by rearranging a URL character string of the vulnerability URL address;
    searching the URL hash value in a first comparison table;

generating, when the URL hash value is present in the first comparison table, a tag hash value corresponding to a response page connected to the vulnerability URL address;

searching the tag hash value in a second comparison table; and determining, when the tag hash value is present in the second comparison table, that the vulnerability is duplicated and excluding the corresponding vulnerability from vulnerability information.

9. An analysis apparatus for determining duplication of a vulnerability of an analysis target server, comprising:

a vulnerability extraction unit extracting a vulnerability URL address including a vulnerability from the analysis target server;

a hash generation unit generating a URL hash value corresponding to the vulnerability by rearranging a URL character string of the vulnerability URL address or generating a tag hash value corresponding to a response page connected to the vulnerability URL address; and a duplication determination unit determining whether the vulnerability is duplicated by using the URL hash value or tag hash value.

* * * * *